(12) United States Patent
Roh et al.

(10) Patent No.: US 11,292,083 B2
(45) Date of Patent: Apr. 5, 2022

(54) METHOD OF MANUFACTURING DISPLAY DEVICE AND LASER DEVICE USED THEREIN

(71) Applicant: SAMSUNG DISPLAY CO., LTD., Yongin-si (KR)

(72) Inventors: Jong-Duk Roh, Yongin-si (KR); Dae-Seung Mun, Cheonan-si (KR); Kwangmin Lee, Goyang-si (KR); Hun So, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/781,443

(22) Filed: Feb. 4, 2020

(65) Prior Publication Data

US 2020/0406397 A1 Dec. 31, 2020

(30) Foreign Application Priority Data

Jun. 25, 2019 (KR) .......................... 10-2019-0075896

(51) Int. Cl.
*B23K 26/18* (2006.01)
*B23K 26/082* (2014.01)
(Continued)

(52) U.S. Cl.
CPC ............ *B23K 26/18* (2013.01); *B23K 26/064* (2015.10); *B23K 26/082* (2015.10); *B32B 37/12* (2013.01); *B32B 37/144* (2013.01); *B32B 37/18* (2013.01); *B32B 38/0012* (2013.01); *B32B 38/10* (2013.01); *B32B 2307/546* (2013.01); *B32B 2310/0831* (2013.01);
(Continued)

(58) Field of Classification Search
CPC .. B23K 26/18; B23K 2103/42; B23K 26/064; B23K 26/38; B23K 26/082; B32B 2310/0843; B32B 37/12; B32B 38/0012; B32B 2457/20; B32B 2307/546; B32B 2310/0831; B32B 37/18; B32B 37/144; B32B 38/10; B32B 2315/08
See application file for complete search history.

(56) References Cited

U.S. PATENT DOCUMENTS

2017/0285786 A1* 10/2017 Hondo ...................... H05K 3/20
2018/0178493 A1* 6/2018 Fujioka ................... B32B 15/09

FOREIGN PATENT DOCUMENTS

KR 10-2016-0141929 12/2016
KR 10-2018-0029739 3/2018
(Continued)

*Primary Examiner* — Vishal I Patel
(74) *Attorney, Agent, or Firm* — F. Chau & Associates, LLC

(57) ABSTRACT

A method of manufacturing a display device includes attaching a protective film onto a display panel that includes a display area and a pad area, where the protective film includes an adhesive layer and a protective layer disposed on the adhesive layer, half-cutting the protective film along a cutting line between the display area and the pad area such that a total thickness of the protective layer and a partial thickness of the adhesive layer are cut, irradiating a partially cut portion of the adhesive layer with a laser beam along at least a portion of the cutting line, and detaching a portion of the protective film that corresponds to the pad area along the cutting line.

15 Claims, 17 Drawing Sheets

(51) Int. Cl.
  *B23K 26/064* (2014.01)
  *B32B 37/12* (2006.01)
  *B32B 37/14* (2006.01)
  *B32B 37/18* (2006.01)
  *B32B 38/00* (2006.01)
  *B32B 38/10* (2006.01)

(52) U.S. Cl.
  CPC ... *B32B 2310/0843* (2013.01); *B32B 2315/08* (2013.01); *B32B 2457/20* (2013.01)

(56) References Cited

FOREIGN PATENT DOCUMENTS

| | | |
|---|---|---|
| KR | 10-1854282 | 4/2018 |
| KR | 10-2018-0070784 | 6/2018 |
| KR | 10-1911574 | 10/2018 |
| KR | 10-1960267 | 3/2019 |

\* cited by examiner

METHOD OF MANUFACTURING DISPLAY DEVICE AND LASER DEVICE USED THEREIN

CROSS-REFERENCE TO RELATED APPLICATION(S)

This application claims priority under 35 USC § 119 from, and the benefit of, Korean Patent Application No. 10-2019-0075896, filed on Jun. 25, 2019 in the Korean Intellectual Property Office (KIPO), the contents of which are herein incorporated by reference in their entirety.

BACKGROUND

1. Technical Field

Embodiments are directed to a method of manufacturing a display device. More particularly, embodiments are directed to a laser device and a method of manufacturing a display device using the laser device.

2. Discussion of the Related Art

A display device such as a television, a monitor, a smartphone, a tablet computer, etc., which displays an image to a user includes a display panel that displays the image. Various display panels, such as liquid crystal display panels, organic light emitting display panels, electrowetting display panels, electrophoretic display panel, etc., have been developed.

Recently, display devices, such as flexible display devices that can be folded or rolled, stretchable display devices that are elastic in at least one direction, etc., are being developed together with technical developments of display devices. A display device can be deformed into a predetermined shape, or deformed into various shapes according to user demands.

A protective film can be attached onto a surface of the display panel to prevent the surface of the display panel from being polluted or damaged during a manufacturing process of the display panel. The protective film may be partially or substantially removed during the manufacturing process of the display panel. Accordingly, methods for detaching a protective film attached to the surface of a display panel are being studied.

SUMMARY

Embodiments provide a method of manufacturing a display device that can prevent damage to a display panel during a manufacturing process.

Embodiments provide a laser device used in a method of manufacturing a display device.

A method of manufacturing a display device according to embodiments includes attaching a protective film on a display panel, wherein the display panel includes a display area and a pad area and the protective film includes an adhesive layer and a protective layer disposed on the adhesive layer, half-cutting the protective film along a cutting line between the display area and the pad area where a total thickness of the protective layer and a partial thickness of the adhesive layer are cut, irradiating a partially cut portion of the adhesive layer with a laser beam along at least a portion of the cutting line, and detaching a portion of the protective film that corresponds to the pad area along the cutting line.

In an embodiment, a wavelength of the laser beam is in a range from 200 nm to 300 nm.

In an embodiment, the adhesive layer includes at least one of polyurethane or silicon.

In an embodiment, an adhesiveness of a first portion of the adhesive layer that is irradiated with the laser beam is less than an adhesiveness of a second portion of the adhesive layer that is not irradiated with the laser beam.

In an embodiment, a concentration of carbon in a first portion of the adhesive layer that is irradiated with the laser beam is less than a concentration of carbon in a second portion of the adhesive layer that is not irradiated with the laser beam, and a concentration of oxygen in the first portion of the adhesive layer is greater than a concentration of oxygen in the second portion of the adhesive layer.

In an embodiment, the laser beam may swing along a width direction of the cutting line while moving along a length direction of the cutting line.

In an embodiment, a swing amplitude of the laser beam is greater than a width of the cutting line.

In an embodiment, a remaining thickness of the partially cut adhesive layer is in a range from 40 μm to 60 μm.

In an embodiment, the display panel includes a substrate, a display unit disposed in the display area on the substrate, and an encapsulation layer that covers the display unit, where the cutting line overlaps the encapsulation layer.

In an embodiment, the substrate includes a flexible glass.

In an embodiment, the display panel includes at least one non-bendable area and at least one bendable area, where the at least one non-bendable area is a rigid area in which the display panel cannot be folded, and the at least one bendable area is a flexible area in which the display panel can be folded, the cutting line is formed between the at least one non-bendable area and the at least one bendable area, the laser beam substantially irradiates the at least one bendable area and forms a hardened portion in the adhesive layer that overlaps the at least one bendable area, and an adhesiveness of the hardened portion of the adhesive layer is less than an adhesiveness of a remaining portion of the adhesive layer outside the hardened portion, and where detached portions of the protective film correspond to the at least one bendable area. The method further includes folding the display panel along the at least one bendable area.

A method of manufacturing a display device according to embodiments includes attaching a protective film onto a mother panel that includes a plurality of display panels that each include a display area and a pad area, where the protective film includes an adhesive layer and a protective layer disposed on the adhesive layer, half-cutting the protective film along a plurality of cutting lines between the display area and the pad area of each of the display panels where a total thickness of the protective layer and a partial thickness of the adhesive layer are cut, irradiating a partially cut portion of the adhesive layer with a laser beam along at least a portion of each of the cutting lines, and detaching portions of the protective film that respectively correspond to each pad area of the plurality of display panels along the cutting lines.

In an embodiment, the cutting lines respectively surround each display area of the plurality of display panels.

In an embodiment, each of the cutting lines has a rectangular shape in a plan view, and the laser beam irradiates at least one side of each of the cutting lines.

In an embodiment, the portions of the protective film that respectively correspond to the pad areas of the display panels are simultaneously detached.

A laser device according to embodiments includes a laser beam generator that generates an input laser beam that has a wavelength in a range from 200 nm to 300 nm, a stage on which a target substrate on which a protective film is attached is seated, and an optical system that optically converts the input laser beam to an output laser beam and that irradiates the target substrate with the output laser beam.

In an embodiment, the optical system includes an optical member, and the optical member is coated to be not damaged by the input laser beam.

In an embodiment, the optical member includes at least one of a beam expander, a lens, a beam splitter, or a mirror.

In an embodiment, a minimum distance between the optical system and the target substrate is at least 200 mm.

In an embodiment, the input laser beam is a $CO_2$ laser beam.

In the method of manufacturing a display device according to embodiments, a protective film may be half-cut, and a laser beam having a predetermined wavelength range may be irradiated to an adhesive layer to decrease an adhesiveness of the adhesive layer. Accordingly, the protective film can be easily detached from the display panel, and the display panel is not damaged.

DETAILED DESCRIPTION OF EXEMPLARY EMBODIMENTS

Hereinafter, methods of manufacturing display devices and laser devices in accordance with embodiments will be explained in detail with reference to the accompanying drawings.

Hereinafter, a method of manufacturing a display device according to an embodiment will be described with reference to FIGS. 1 to 16.

Figure 1:
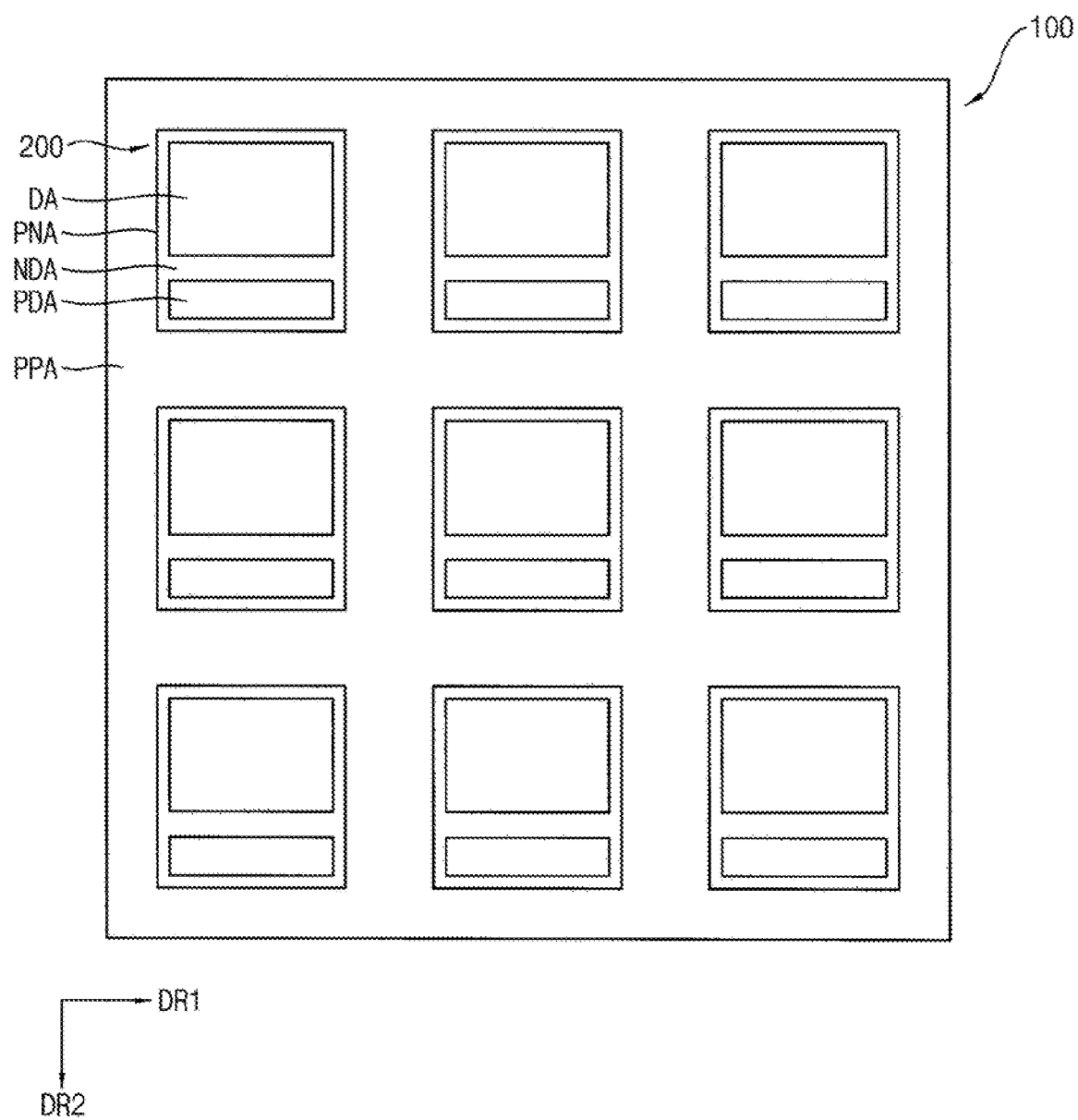
FIG. 1 is a plan view that illustrates a step of providing a mother panel according to an embodiment.

FIG. 1 is a plan view that illustrates a step of providing a mother panel 100 according to an embodiment.

Referring to FIG. 1, according to an embodiment, a mother panel 100 includes a plurality of panel areas PNA and a peripheral area PPA. The mother panel 100 includes a plurality of display panels 200 respectively disposed in the panel areas PNA. The display panels 200 are respectively formed in the panel areas PNA by one of a deposition process, a photolithography process, an etching process, etc. The display panels 200 are substantially simultaneously formed by substantially the same processes.

According to an embodiment, the display panels 200 are arranged in a matrix along a first direction DR1 and a second direction DR2 that crosses the first direction DR1. FIG. 1 illustrates that the display panels 200 are arranged in a 3×3 matrix. However, embodiments of the present disclosure are not limited thereto, and the display panels 200 can be arranged in a M×N matrix, where each of the M and N is a natural number. The peripheral area PPA is located outside the panel areas PNA. For example, the peripheral area PPA is located between panel areas PNA that are spaced apart from each other, and surrounds the panel areas PNA.

According to an embodiment, each of the display panels 200 includes a display area DA and a non-display area NDA. An image can be displayed in the display area DA. The non-display area NDA is located outside the display area DA. For example, the non-display area NDA surrounds the display area DA. The non-display area NDA includes a pad area PDA.

Figure 2:
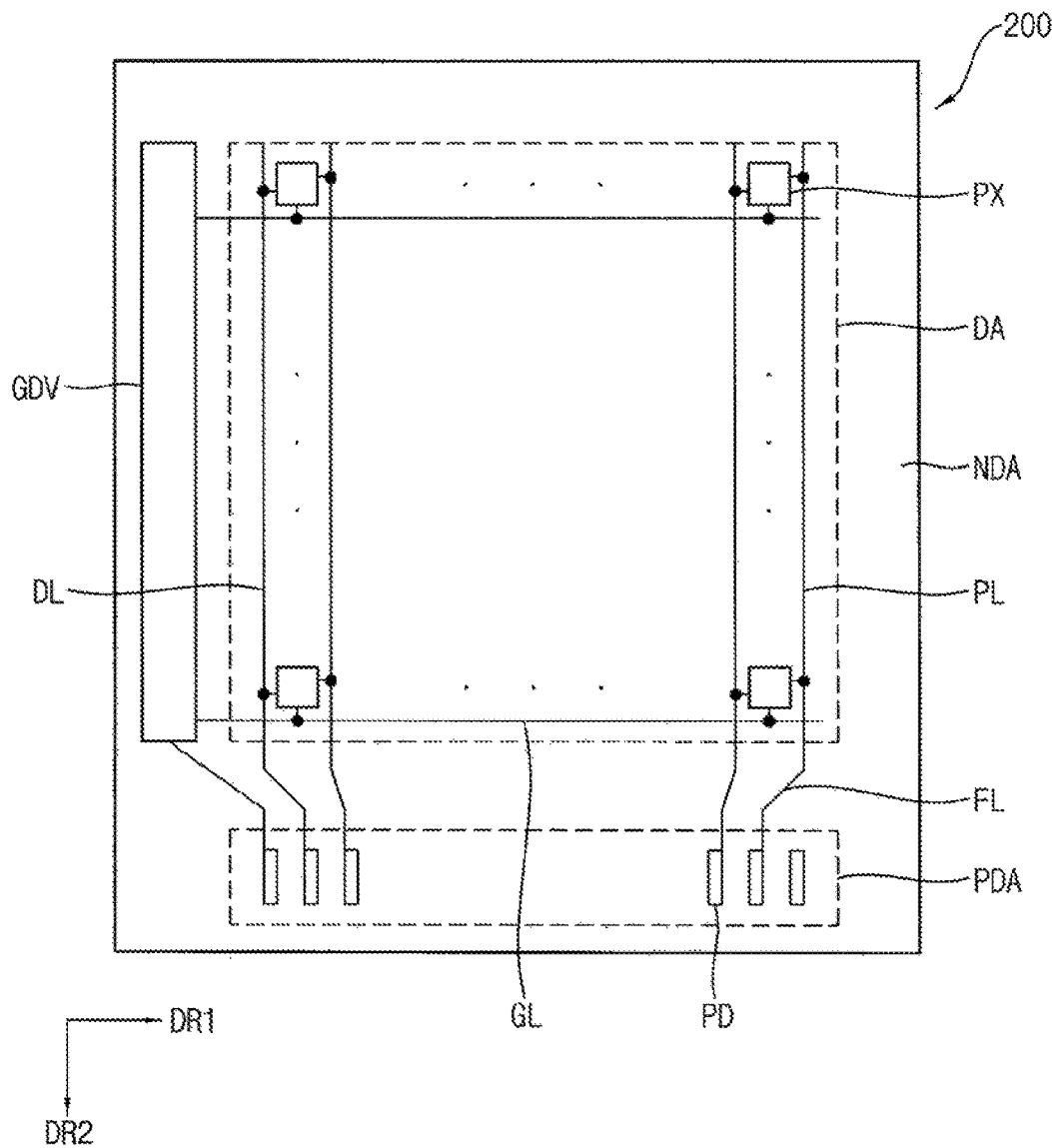
FIG. 2 is a plan view of a display panel included in a mother panel in FIG. 1.

FIG. 2 is a plan view of a display panel 200 included in a mother panel 100 in FIG. 1.

Referring to FIG. 2, according to an embodiment, the display panel 200 includes a plurality of pixels PX, a plurality of lines GL, DL, PL, and FL, a gate driver GDV, and a plurality of pads PD.

According to an embodiment, the pixels PX are disposed in the display area DA. The pixels PX are arranged in a matrix along the first direction DR1 and the second direction DR2. Each of the pixels PX includes a circuit element and a light emitting element connected to the circuit element.

According to an embodiment, the lines GL, DL, PL, and FL are disposed in the display area DA and the non-display area NDA. The lines GL, DL, PL, and FL include gate lines GL, data lines DL, power lines PL, and fan-out lines FL. The gate lines GL extend along the first direction DR1, and are respectively connected to the pixels PX. The data lines DL and power lines PL extend along the second direction DR2, and are respectively connected to the pixels PX. The fan-out lines FL are respectively connected to the data lines DL or the power lines PL.

According to an embodiment, the gate driver GDV is disposed in the non-display area NDA. The gate driver GDV is connected to the gate lines GL. The gate driver GDV generates gate signals, and sequentially outputs the gate signals to the gate lines GL.

According to an embodiment, the pads PD are disposed in the pad area PDA. The pads PD are respectively connected to the fan-out lines FL. The pads PD are electrically connected to an external device that generates data signals, power signals, etc. The pads PD output data signals to the data lines DL through a first set of the fan-out lines FL, and output the power signals to the power lines PL through a second set of the fan-out lines FL.

Figure 3:
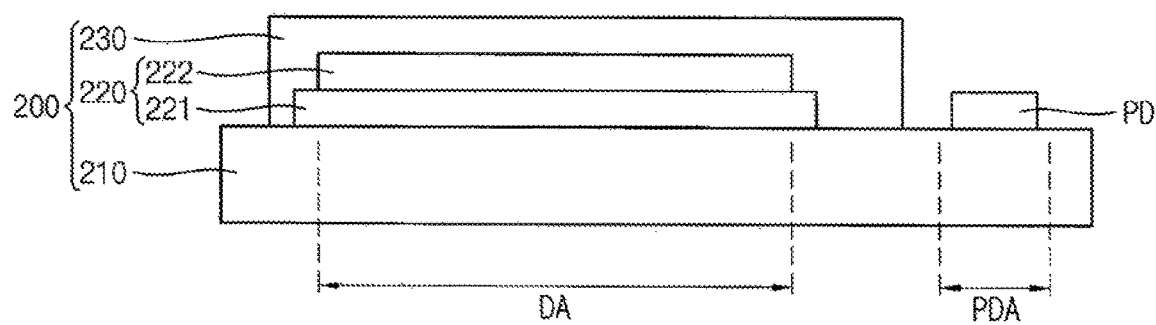
FIG. 3 is a cross-sectional view of a display panel in FIG. 2.

FIG. 3 is a cross-sectional view of the display panel 200 in FIG. 2.

Referring to FIG. 3, according to an embodiment, the display panel 200 includes a substrate 210, a display unit 220, an encapsulation layer 230, and the pad PD.

According to an embodiment, the substrate 210 includes one of a glass, a plastic such as polyimide (PI), etc. In an embodiment, the substrate 210 is flexible. For example, the substrate 210 includes a flexible glass. However, in other embodiments, a material of the substrate 210 is not limited thereto.

According to an embodiment, the display unit 220 is disposed on the substrate 210 in the display area DA. The display unit 220 includes the pixels PX, and displays an image based on light emitted from each of the pixels PX. The display unit 220 includes a circuit layer 221 and an emission layer 222.

According to an embodiment, the circuit layer 221 is disposed on the substrate 210. The circuit layer 221 includes the circuit elements of the pixels PX. The circuit elements included in the circuit layer 221 generate driving currents, and provide the driving currents to the emission layer 222.

According to an embodiment, the emission layer 222 is disposed on the circuit layer 221. The emission layer 222 includes the light emitting elements of the pixels PX. In an embodiment, each of the light emitting elements is an organic light emitting element. However, embodiments of the present disclosure are not limited thereto, and in other embodiments, each of the light emitting elements may be a liquid crystal element, a quantum dot light emitting element, etc. The light emitting elements included in the emission layer 222 emit light based on the driving currents.

According to an embodiment, the encapsulation layer 230 covers the display unit 220. The encapsulation layer 230 is formed on the substrate 210 on which the display unit 220 is disposed, and encapsulates the display unit 220. The encapsulation layer 230 protects the light emitting elements of the emission layer 222 from impurities such as oxygen, external moisture, etc.

According to an embodiment, the encapsulation layer 230 includes at least one inorganic layer and at least one organic layer. In an embodiment, the encapsulation layer 230 includes a first inorganic layer that covers the display unit 220, an organic layer disposed on the first inorganic layer and formed in the display area DA, and a second inorganic layer that covers the organic layer. An edge of the second inorganic layer is in contact with an edge of the first inorganic layer.

Figure 4:
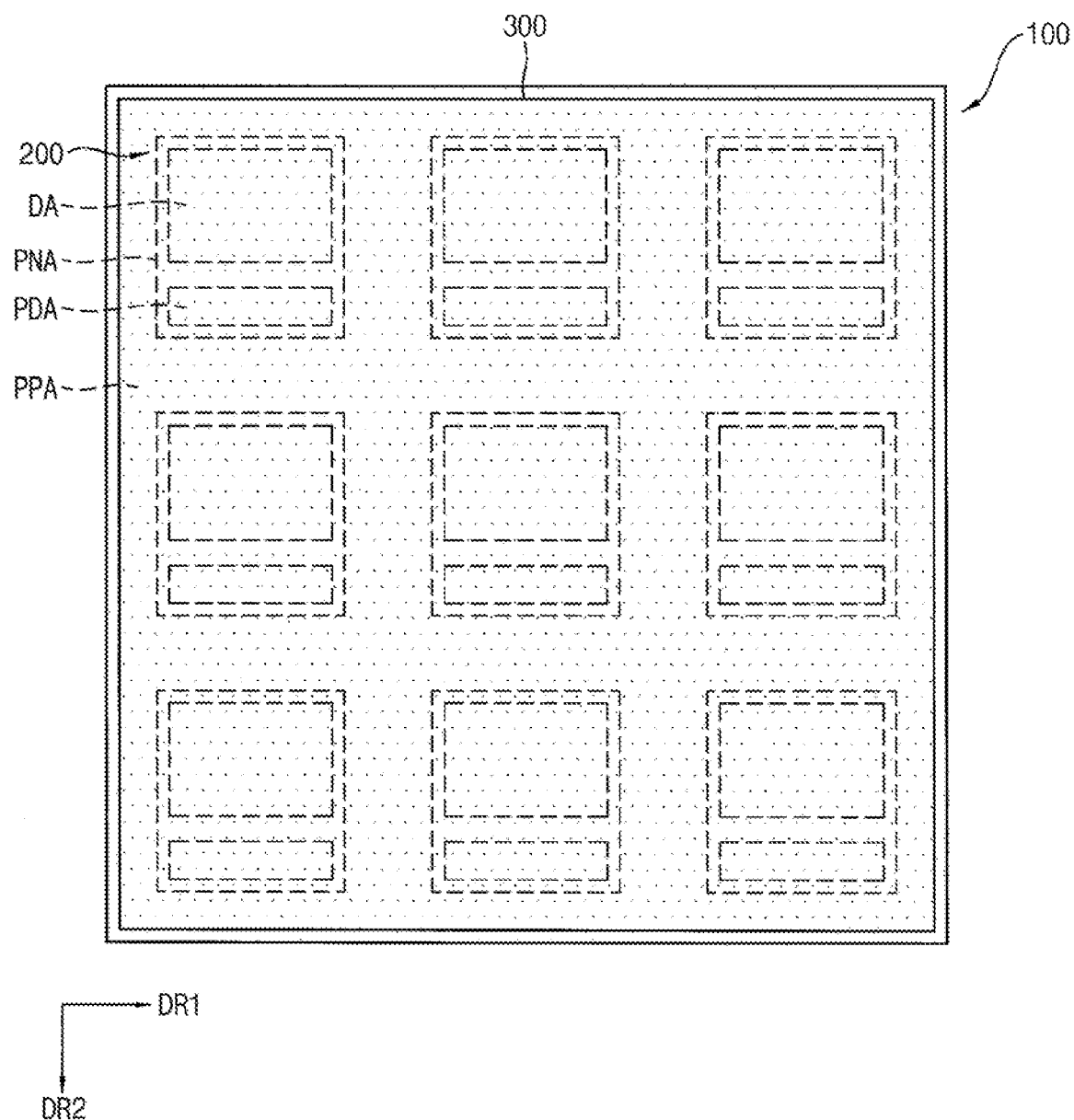
FIGS. 4 and 5 illustrate a step of attaching a protective film according to an embodiment.
Figure 5:
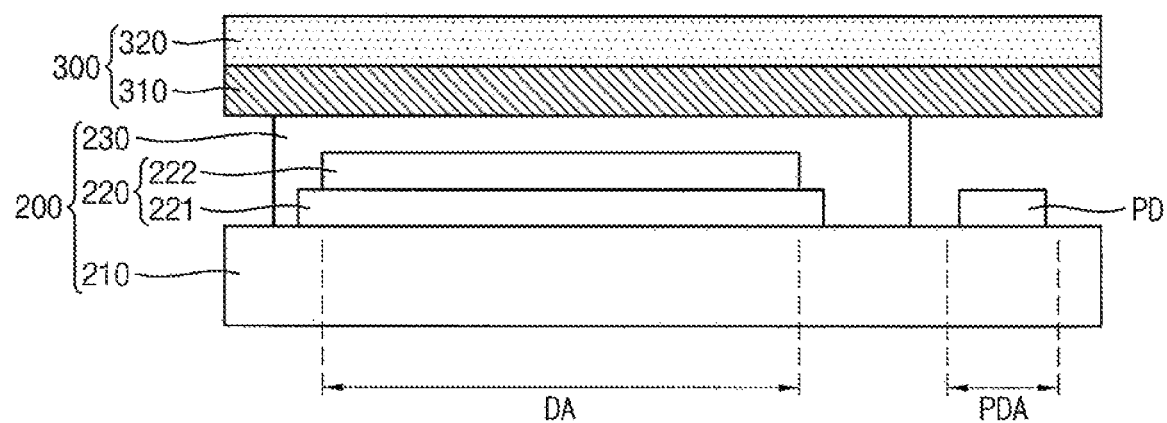

FIGS. 4 and 5 illustrate a step of attaching a protective film 300, according to an embodiment.

Referring to FIG. 4, according to an embodiment, a protective film 300 is attached onto the mother panel 100 that includes the display panels 200. The protective film 300 overlaps the panel areas PNA and the peripheral area PPA of the mother panel 100 in a plan view and covers the display panels 200. Accordingly, the protective film 300 overlaps the display area DA and the pad area PDA of each of the display panels 200.

Referring to FIG. 5, according to an embodiment, the protective film 300 is attached onto the display panel 200. For example, the protective film 300 overlaps the encapsulation layer 230 and the pad PD, and is attached onto an upper portion of the encapsulation layer 230. FIG. 5 illustrates that the protective film 300 is not attached to the pad PD, however, in other embodiments, the protective film 300 conforms to a profile of the encapsulation layer 230 and the pad PD, and is attached onto the pad PD.

According to an embodiment, the protective film 300 includes an adhesive layer 310 and a protective layer 320 disposed on the adhesive layer 310. The protective film 300 is attached to the display panel 200 such that the adhesive layer 310 is in contact with the display panel 200. In other words, the protective layer 320 is attached to the display panel 200 through the adhesive layer 310.

According to an embodiment, the adhesive layer 310 includes an adhesive material. In an embodiment, the adhesive layer 310 includes at least one of polyurethane (PU) or silicon (Si). A thickness of the adhesive layer 310 is in a range from about 65 µm to about 100 µm. The adhesive layer 310 attaches the protective film 300 to the display panel 200.

According to an embodiment, the protective layer 320 includes a flexible material. For example, the protective layer 320 includes a polymer resin such as polyethylene terephthalate (PET), etc. A thickness of the protective layer 320 is in a range from about 65 µm to about 100 µm. The protective layer 320 prevents moisture, oxygen, etc., from permeating into the display panel 200 and prevents the display panel 200 from being damaged by external impacts.

Figure 6:
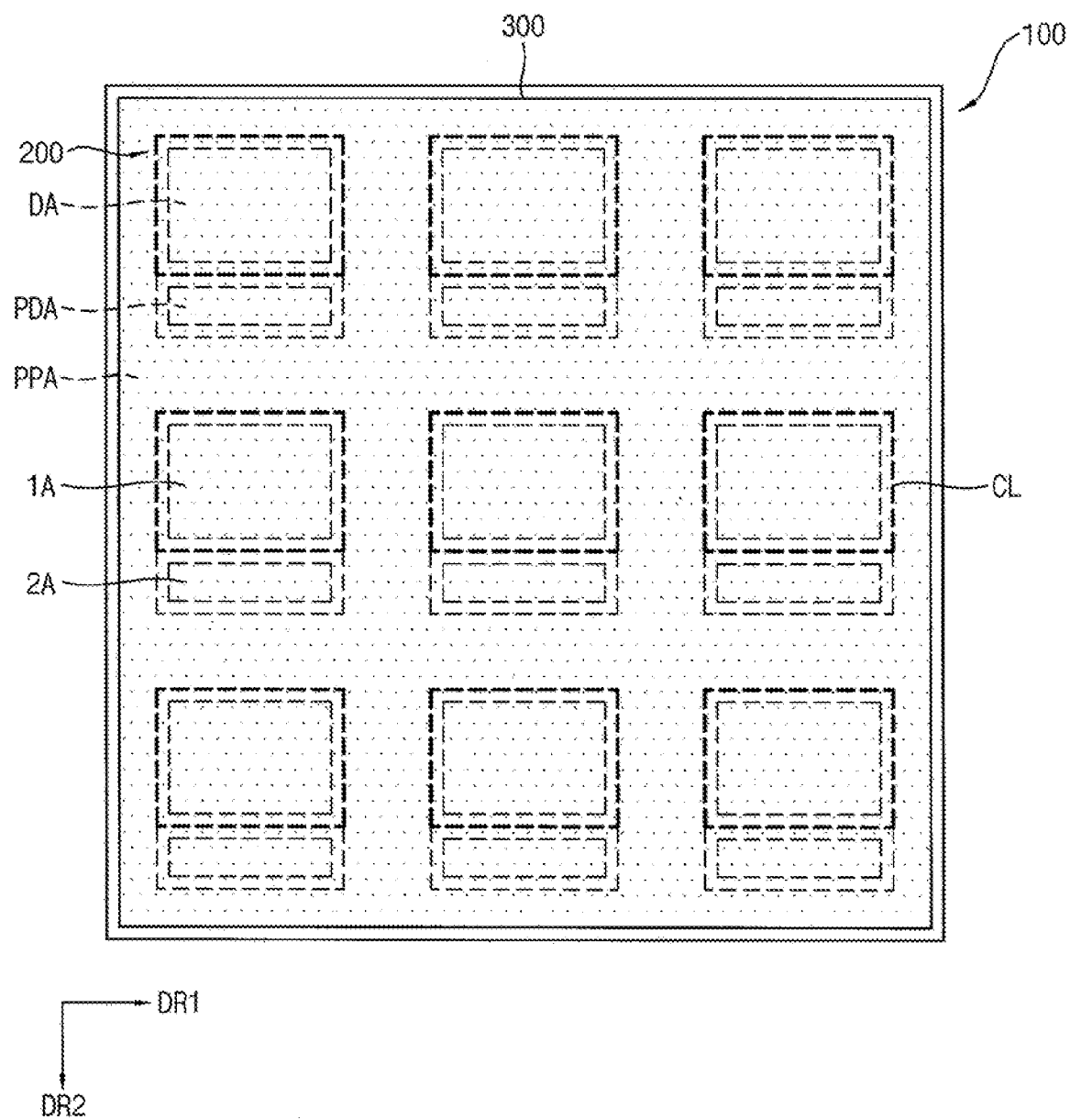
FIGS. 6 and 7 illustrate a step of half-cutting a protective film according to an embodiment.
Figure 7:
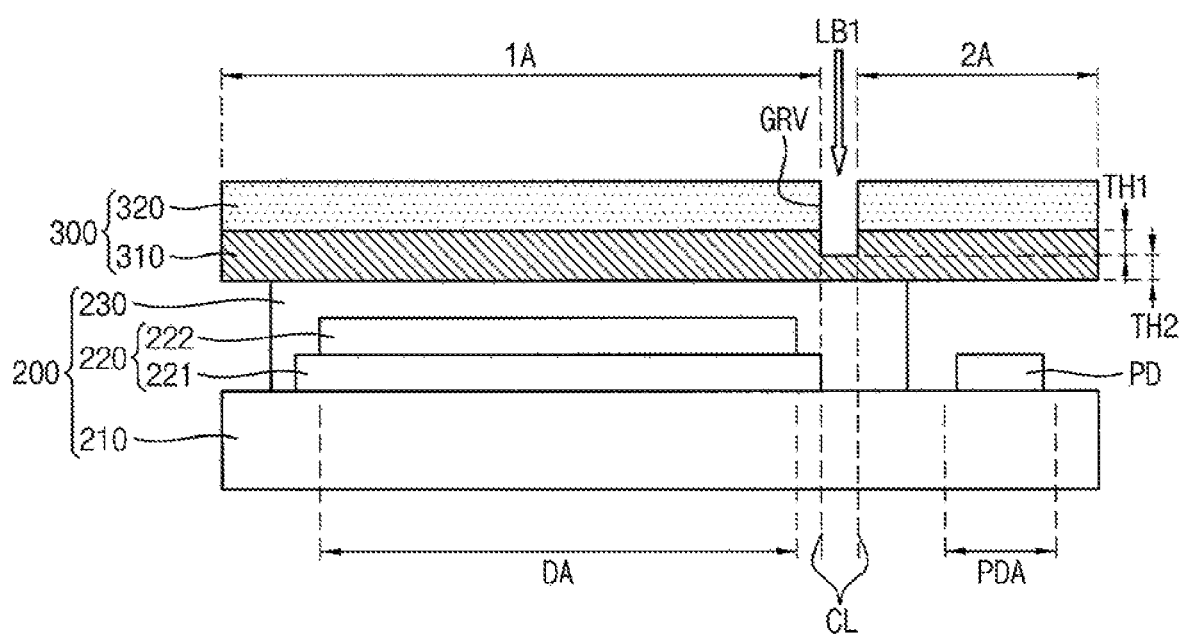

FIGS. 6 and 7 illustrate a step of half-cutting the protective film 300, according to an embodiment.

Referring to FIG. 6, according to an embodiment, the protective film 300 is half-cut along cutting lines CL.

According to an embodiment, a plurality of cutting lines CL for half-cutting the protective film 300 are formed on the protective film 300. The cutting lines CL respectively surround the display areas DA in a plan view. In an embodiment, each of the cutting lines CL may have a rectangular shape in a plan view. Accordingly, each of the cutting lines CL is a closed curve. In this case, areas in the protective film 300 that are respectively surrounded by the cutting lines CL are referred to as first areas 1A, and an area in the protective film 300 outside the first areas 1A is referred to as a second area 2A. The first areas 1A respectively overlap the display areas DA in a plan view, and the second area 2A overlaps the pad area PDA and the peripheral area PPA in a plan view. A portion of each of the cutting lines CL is located between the display area DA and the pad area PDA of each of the display panels 200 in a plan view.

Referring to FIG. 7, according to an embodiment, the cutting line CL is located between the display area DA and the pad area PDA, and overlaps the encapsulation layer 230. The protective film 300 is half-cut such that a partial thickness of the protective film 300 is cut along the cutting line CL. For example, the protective film 300 is half-cut such that a total thickness of the protective layer 320 and a partial thickness of the adhesive layer 310 are cut. A portion of the adhesive layer 310 that corresponds to the cutting line CL is cut by a first thickness TH1 from an upper surface of the adhesive layer 310. The portion of the adhesive layer 310 that corresponds to the cutting line CL has a second thickness TH2 that is obtained by subtracting the first thickness TH1 from the total thickness of the adhesive layer 310 with respect to a lower surface of the adhesive layer 310. Accordingly, a groove GRV that corresponds to the cutting line CL is formed in the protective film 300. In an embodiment, the second thickness TH2 is in a range from about 40 µm to about 60 µm.

In an embodiment, the protective film 300 is half-cut by a $CO_2$ laser beam LB. A total thickness of the protective layer 320 is cut from an upper surface of the protective layer 320 toward a lower surface of the protective layer 320 and a partial thickness of the adhesive layer 310 is cut from an upper surface of the adhesive layer 310 toward a lower surface of the adhesive layer 310 by the $CO_2$ laser beam LB irradiated from above the protective film 300.

FIGS. 8, 9, 10, and 11 illustrate a step of irradiating the protective film 300 with a laser beam according to an embodiment.

Figure 8:
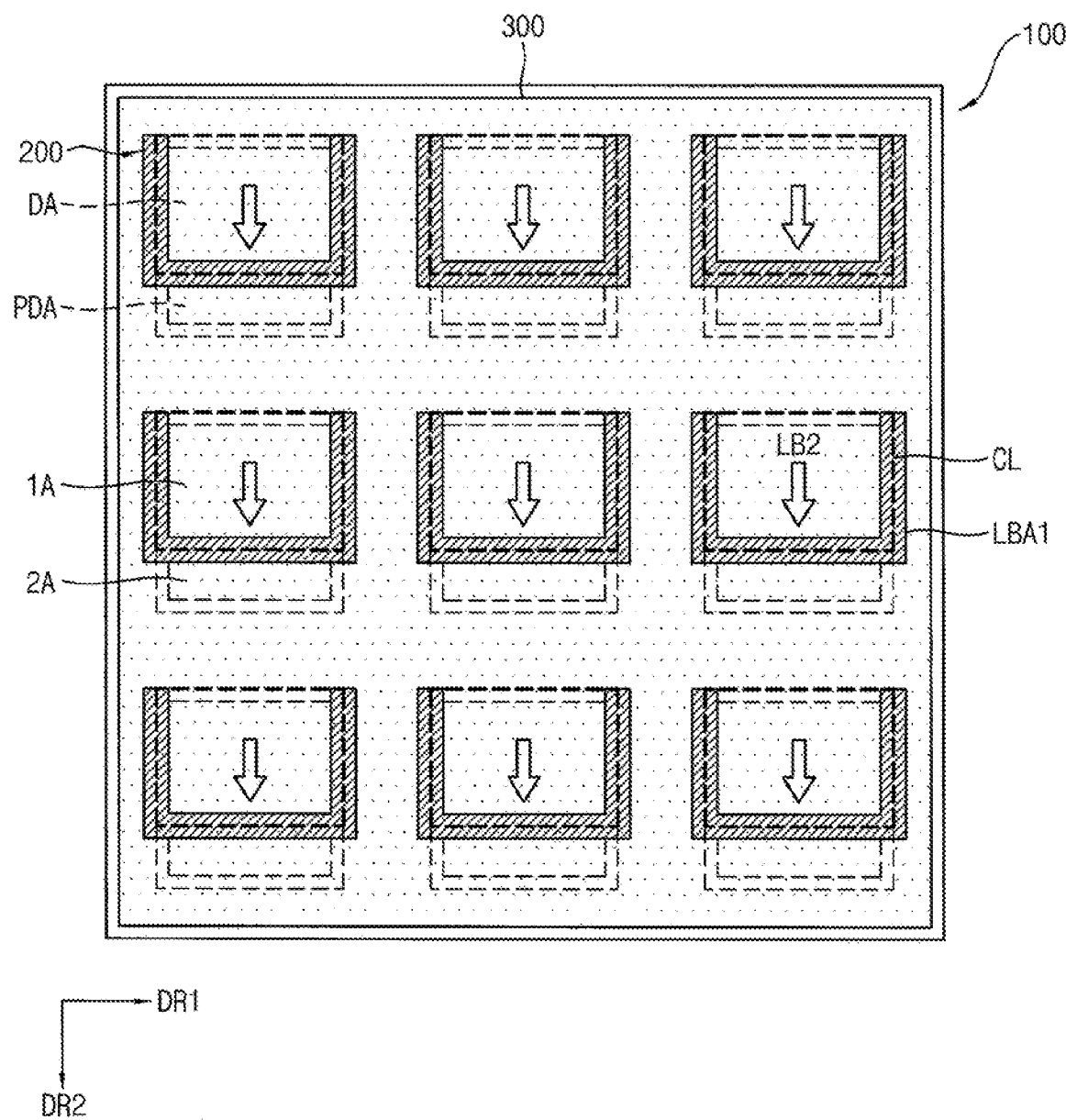
FIGS. 8, 9, 10, and 11 illustrate a step of irradiating a protective film with a laser beam according to an embodiment.
Figure 9:
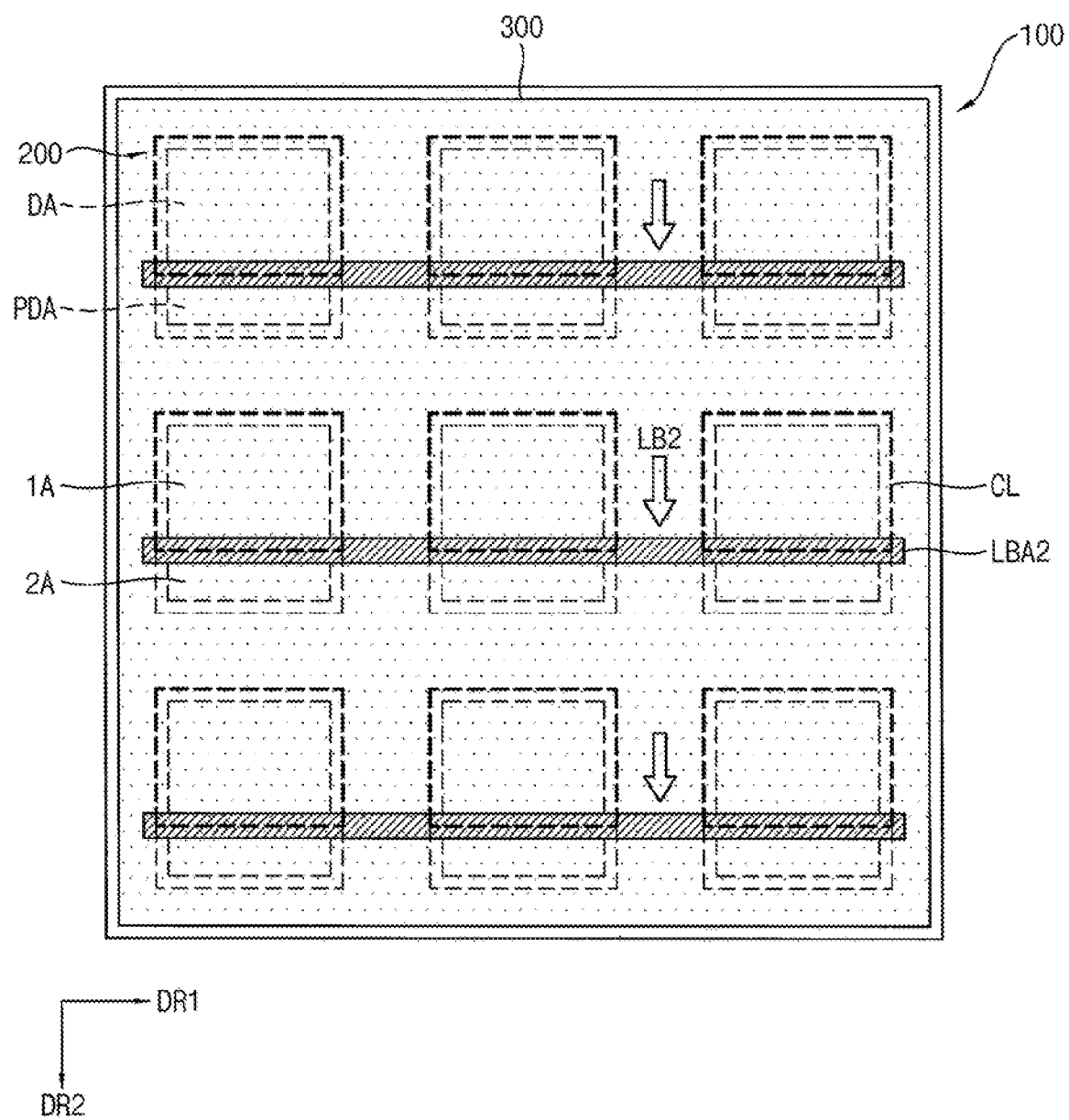

Referring to FIGS. 8 and 9, according to an embodiment, the protective film 300 is irradiated with a laser beam LB2 along at least a portion of each of the cutting lines CL. Areas of the protective film 300 irradiated with the laser beam LB2 are referred to as laser beam irradiation areas LBA1 and LBA2, and the laser beam irradiation areas LBA1 and LBA2 respectively overlap at least a portion of each of the cutting lines CL. In an embodiment, when each of the cutting lines CL encloses a rectangular shape in a plan view, the laser beam LB2 is irradiated to at least one side of each of the cutting lines CL. In other words, the laser beam irradiation areas LBA1 and LBA2 overlap at least one side of each of the cutting lines CL in a plan view. For example, when the laser beam LB2 is irradiated to one of the four sides of each of the cutting lines CL, each of the laser beam irradiation areas LBA1 and LBA2 is a line segment.

In an embodiment, the laser beam LB2 is separately irradiated for three of the four cutting lines CL as illustrated in FIG. 8. In other words, the laser beam irradiation areas LBA1 that correspond to three of the four cutting lines CL are formed in the protective film 300. For example, laser beam irradiation areas LBA1 are formed in the protective film 300 that have a shape that surrounds three sides of the display area DA. However, embodiments are not limited thereto, and in other embodiments, the laser beam irradiation areas LBA1 correspond to one or two of the sides of the display area DA.

In another embodiment, the laser beam LB2 is integrally irradiated for the plurality of cutting lines CL as illustrated in FIG. 9. In other words, each laser beam irradiation area LBA2 formed in the protective film 300 corresponds to a plurality of cutting lines CL. For example, laser beam irradiation areas LBA2 are formed in the protective film 300 that overlap one side of each of the cutting lines CL along the first direction DR1 and have a straight line shape that extends along the first direction DR1. In other embodiments, the laser beam irradiation areas LBA2 formed in the protective film 300 overlap one side of each of the cutting lines CL along the second direction DR2 and have a straight line shape that extends along the second direction DR2.

Figure 10:
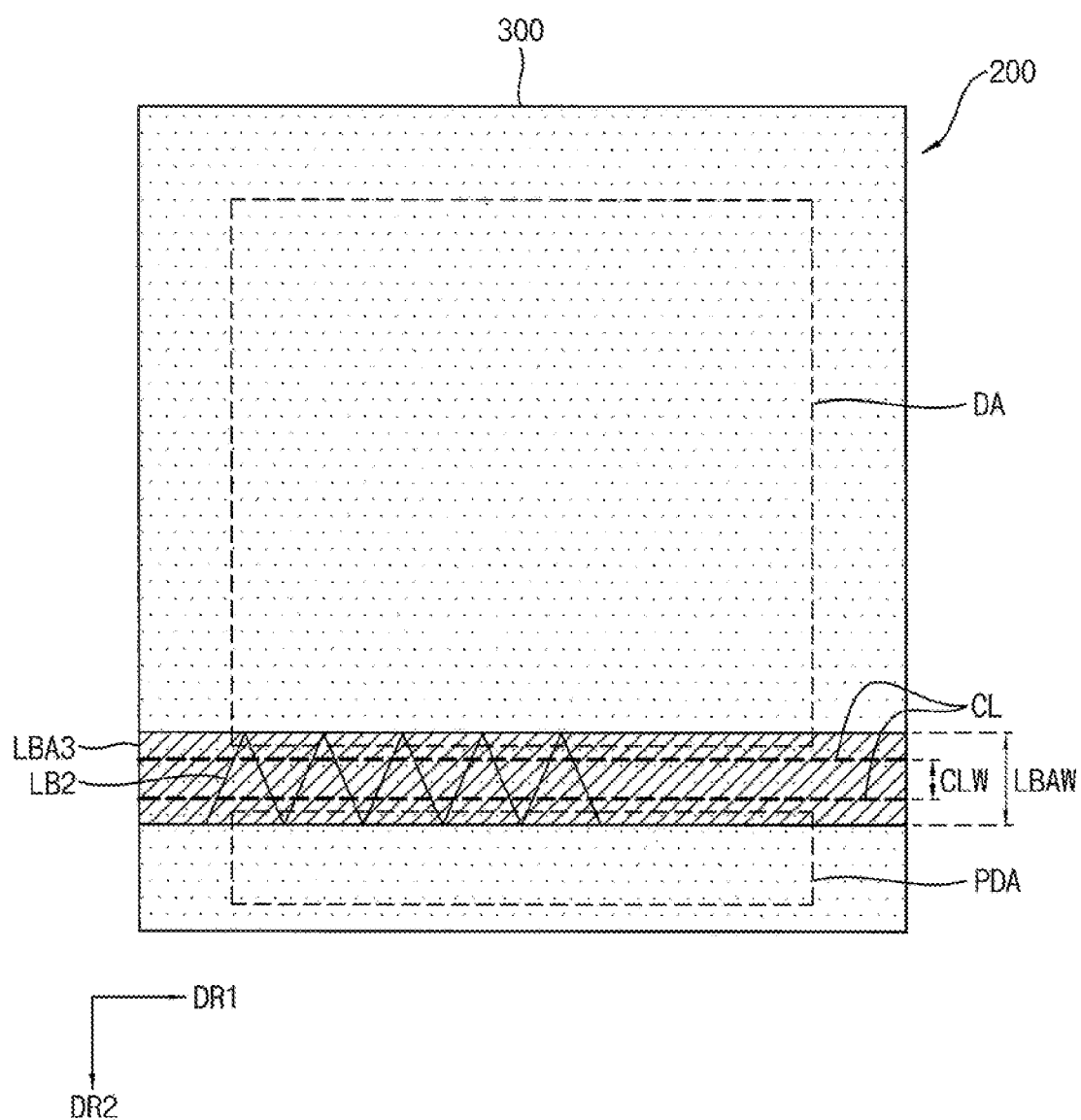

According to an embodiment, FIG. 10 illustrates that the protective film 300 attached to the display panel 200 of the mother panel 100 shown in FIG. 8 or 9 is irradiated with the laser beam LB2.

Referring to FIG. 10, according to an embodiment, the laser beam LB2 irradiated to the protective film 300 swings along a width direction of the cutting line CL while moving along a length direction of the cutting line CL. For example, when the cutting line CL extends along the first direction DR1, the laser beam LB2 being irradiated swings along the second direction DR2 while moving along the first direction DR1. Accordingly, the path of the laser beam LB2 on the protective film 300 has a zigzag shape.

According to an embodiment, when the laser beam LB2 is irradiated by a laser device, an alignment margin of the laser device can cause an error between an area to which the laser beam LB2 is to be irradiated and an area to which the laser beam LB2 is actually irradiated. In a comparative example, when the laser beam LB2 is irradiated along the length direction of the cutting line CL without swinging, an error of the laser beam LB2 can occur in a direction perpendicular to a displacement direction of the laser beam LB2. Accordingly, the laser beam LB2 can partially irradiated a region outside of the cutting line CL. However, in a present embodiment, the laser beam LB2 is irradiated along the length direction of the cutting line CL while swinging along the width direction of the cutting line CL, so that the laser beam LB2 substantially irradiates a region inside the cutting line CL, although an error of the laser beam LB2 can occurs in a direction perpendicular to the displacement direction of the laser beam LB2.

According to an embodiment, a swing amplitude of the laser beam LB2 is greater than a width CLW of the cutting line CL. Because the swing amplitude of the laser beam LB2 along the width direction of the cutting line CL is greater than the width CLW of the cutting line CL, a width LBAW of the laser beam irradiation area LBA3 is greater than the width CLW of the cutting line CL. For example, the width CLW of the cutting line CL is in a range from about 30 μm to about 300 μm, and the width LBAW of the laser beam irradiation area LBA3 is greater than the width CLW of the cutting line CL. Accordingly, an area LBA3 irradiated by the laser beam LB2 increases, although the laser beam LB2 still substantially irradiates a portion of the protective film 300 inside the cutting line CL.

Figure 11:
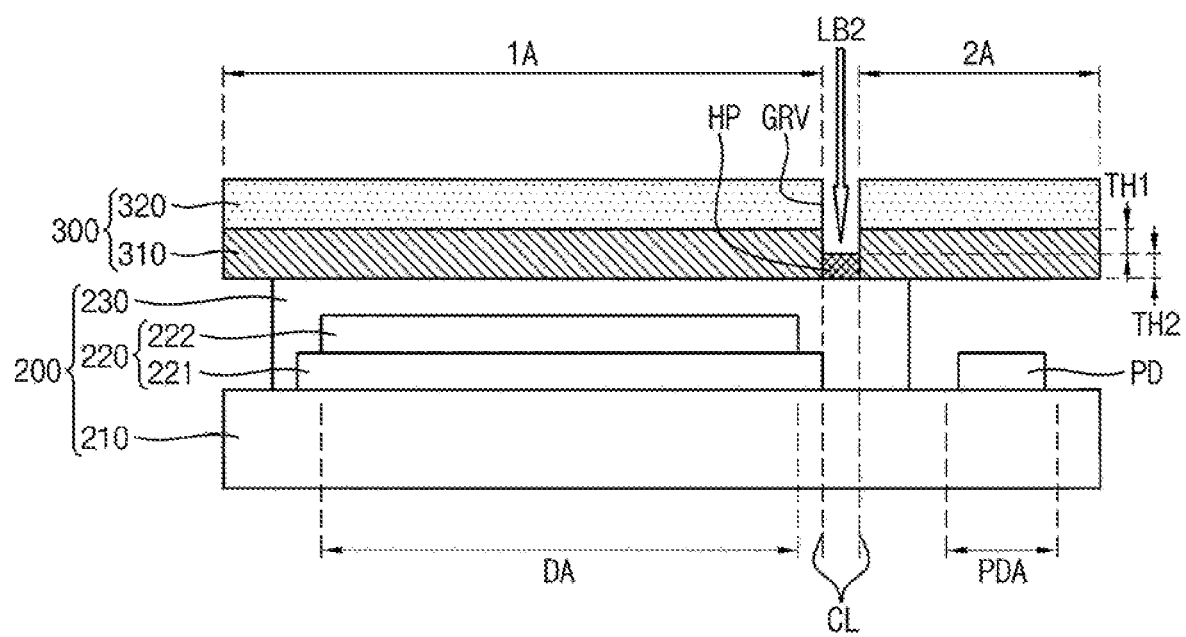

Referring to FIG. 11, according to an embodiment, the laser beam LB2 irradiates a half-cut portion of the adhesive layer 310 having the second thickness TH2 which was not fully cut by the half-cutting along the cutting line CL. The laser beam LB2 irradiates the groove GRV of the protective film 300, and the half-cut portion of the adhesive layer 310 is hardened by the laser beam LB2 to form a hardened portion HP.

According to an embodiment, the laser beam LB2 has a wavelength in a range from about 200 nm to about 300 nm, or in a range from about 200 nm to about 280 nm. In other words, the laser beam LB2 is a deep-ultraviolet (DUV) laser beam. The DUV laser beam LB2 irradiates the half-cut portion of the adhesive layer 310 to form the hardened portion HP.

According to an embodiment, when the DUV laser beam LB2 irradiates the adhesive layer 310, an adhesiveness of the irradiated portion of the adhesive layer 310 decreases. Accordingly, an adhesiveness of a first, irradiated portion of the adhesive layer 310 is less than an adhesiveness of a second, non-irradiated portion of the adhesive layer 310. In other words, an adhesiveness of the hardened portion HP of the adhesive layer 310 is less than an adhesiveness of a remaining portion of the adhesive layer 310 outside the hardened portion HP.

According to an embodiment, when the DUV laser beam LB2 irradiates the adhesive layer 310, a chemical composition of the irradiated portion of the adhesive layer 310 changes. A concentration of carbon in the irradiated portion of the adhesive layer 310 decreases, and a concentration of oxygen in the irradiated portion of the adhesive layer 310 increases. Accordingly, a concentration of carbon in the first, irradiated portion of the adhesive layer 310 is less than a concentration of carbon in a second, non-irradiated portion of the adhesive layer 310, and a concentration of oxygen in the first portion of the adhesive layer 310 is greater than a concentration of oxygen in the second portion of the adhesive layer 310. In other words, a concentration of carbon in the hardened portion HP of the adhesive layer 310 is less than a concentration of carbon in a remaining portion of the adhesive layer 310 outside the hardened portion HP, and a concentration of oxygen of the hardened portion HP of the adhesive layer 310 is greater than a concentration of oxygen in a remaining portion of the adhesive layer 310 outside the hardened portion HP. The concentration decrease of carbon and the concentration increase of oxygen of the adhesive layer 310 result from a decrease of carbon-carbon (C—C) bonds and an increase of carbon-oxygen (C—O) bonds in the adhesive layer 310 due to the irradiation of the laser beam LB2 to the adhesive layer 310.

In a comparative example, when a laser beam having a wavelength greater than about 300 nm, e.g., a near-ultraviolet (NUV) laser beam, is irradiated to an uncut adhesive layer 310, an adhesiveness of the irradiated adhesive layer 310 does not decrease. In addition, the irradiated adhesive layer 310 may be cut or removed, which can damage the underlying encapsulation layer 230. However, in a present embodiment, when the DUV laser beam LB2 irradiates the uncut adhesive layer 310, an adhesiveness of the irradiated adhesive layer 310 decreases, and the protective film 300 can be easily detached in a subsequent detaching process.

Figure 12:
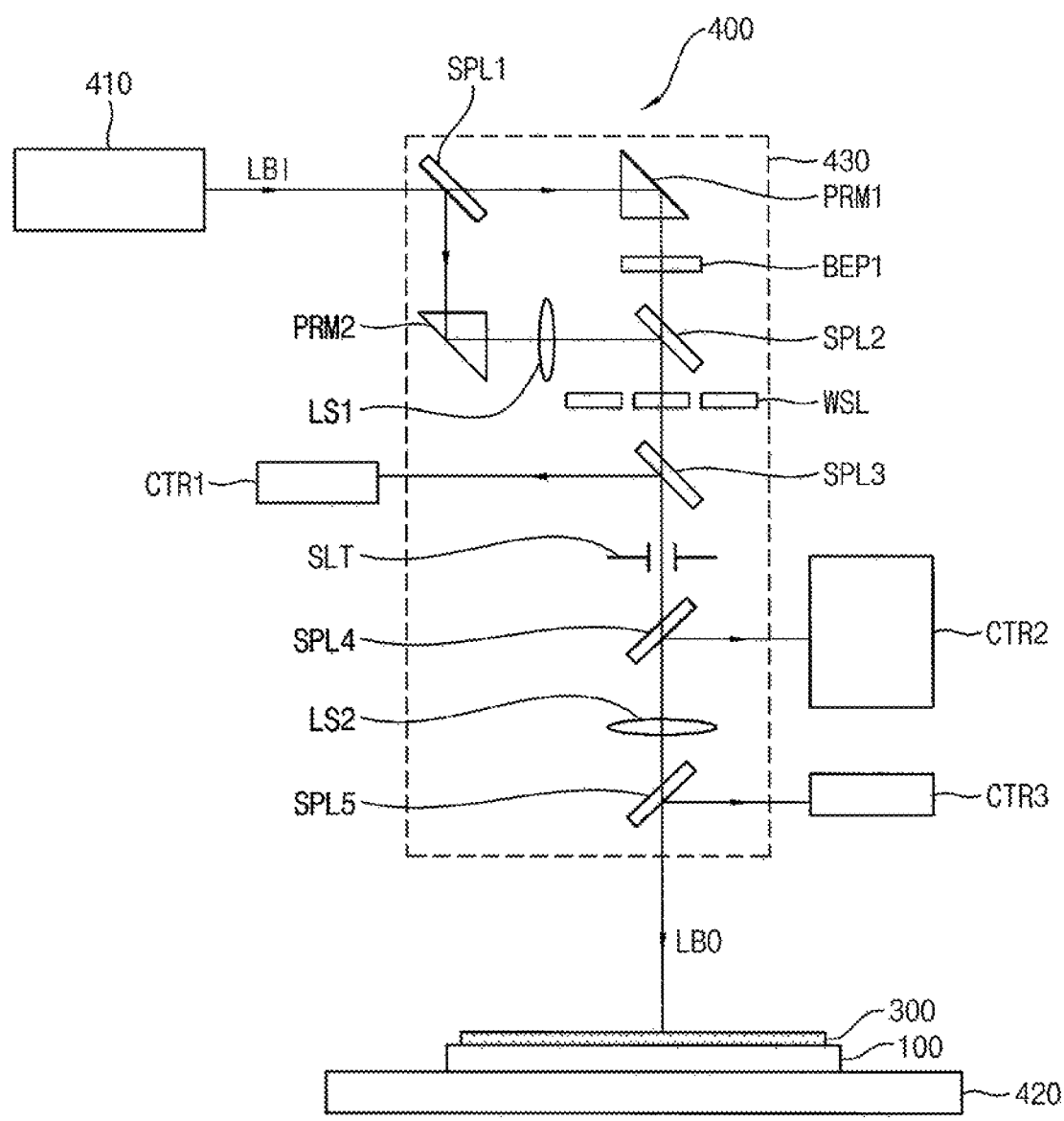
FIGS. 12 and 13 illustrate a laser device that emits a laser beam applicable to an embodiment.
Figure 13:
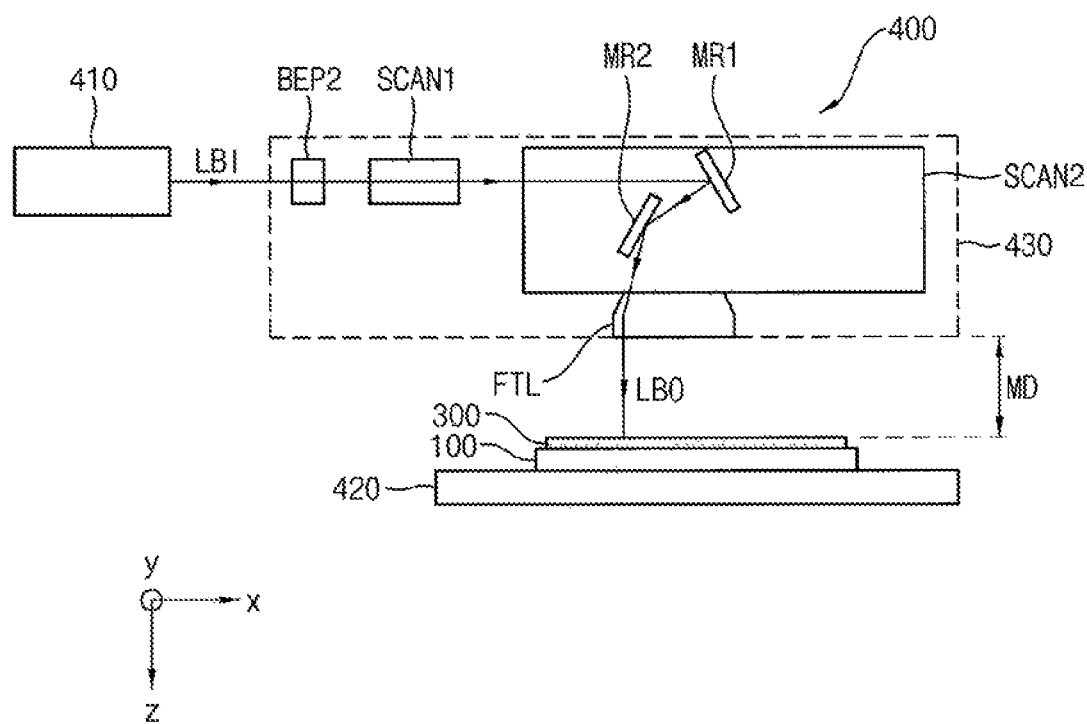

FIGS. 12 and 13 illustrate a laser device 400 that emits the laser beam LB2, according to an embodiment.

Referring to FIGS. 12 and 13, according to an embodiment, the laser device 400 includes a laser beam generator 410, a stage 420, and an optical system 430.

According to an embodiment, the laser beam generator 410 generates an input laser beam LBI having a wavelength in a range from about 200 nm to about 300 nm. In an embodiment, the input laser beam LBI is a deep-ultra violet (DUV) laser beam having a wavelength of about 266 nm.

According to an embodiment, a target substrate on which the protective film 300 is attached is seated on the stage 420. The target substrate is the aforementioned mother panel 100. The stage 420 supports the target substrate.

According to an embodiment, the optical system 430 optically converts the input laser beam LBI to an output laser beam LBO. The output laser beam LBO is the aforementioned laser beam LB2 having a wavelength in a range from about 200 nm to about 300 nm. The optical system 430 irradiates the target substrate on the stage 420 with the output laser beam LBO. The optical system 430 irradiates the output laser beam LBO to a predetermined area in the target substrate.

According to an embodiment, the optical system 430 includes optical members that optically convert the input laser beam LBI to the output laser beam LBO and irradiate the output laser beam LBO to a predetermined area in the target substrate. The optical members include at least one of a beam expander, a lens, a beam splitter, or a mirror. Part of the input laser beam LBI is reflected by the optical members and other part of the input laser beam is transmitted through the optical members, so that the input laser beam LBI is optically converted to the output laser beam LBO. The optical members are coated to be not damaged by the input laser beam LBI. For example, the optical members are coated to be not damaged by a 266 nm deep-ultra violet (DUV) laser beam. In addition, positions or angles of the optical members are controlled such that the output laser beam LBO irradiates a predetermined area in the target substrate.

In an embodiment, the optical system 430 includes beam splitters SPL1, SPL2, SPL3, SPL4, and SPL5, prisms PRM1 and PRM2, a beam expander BEP1, lenses LS1 and LS2, a wavelength selector WSL, and a slit SLT as illustrated in FIG. 12. A laser beam passing through the optical system 430 is transmitted to controllers CTR1, CTR2, and CTR3 through the beam splitters SPL3, SPL4, and SPL5, and the controllers CTR1, CTR2, and CTR3 control a position, direction, etc., of the laser beam. In such an embodiment, the optical system 430 illustrated in FIG. 12 is a line beam optical system. The line beam optical system 430 irradiates the target substrate with the output laser beam LBO while the optical system 430 moves.

In another embodiment, illustrated in FIG. 13, the optical system 430 includes a beam expander BEP2, a first scanner SCAN1, and a second scanner SCAN2. The second scanner SCAN2 includes mirrors MR1 and MR2 and an f-theta lens FTL. The first scanner SCN1 controls a position in a z-direction of a laser beam passing through the optical system 430, the mirrors MR1 and MR2 control a position in a x-direction and a y-direction of the laser beam passing through the optical system 430, and the laser beam passing through the optical system 430 is transmitted through the f-theta lens FTL. In such an embodiment, the optical system 430 illustrated in FIG. 13 is a spot optical system. The spot optical system 430 irradiates the target substrate with the output laser beam LBO with a moving optical system 430 or second scanner SCAN2.

In an embodiment, a minimum distance MD between the optical system 430 and the target substrate is at least about 200 mm. For example, the minimum distance MD is a direct distance between the f-theta lens FTL in the second scanner SCAN2 and the target substrate. When the minimum distance MD is less than about 200 mm, the output laser beam LBO irradiated from the optical system 430 does not cover a total area of the target substrate.

Figure 14:
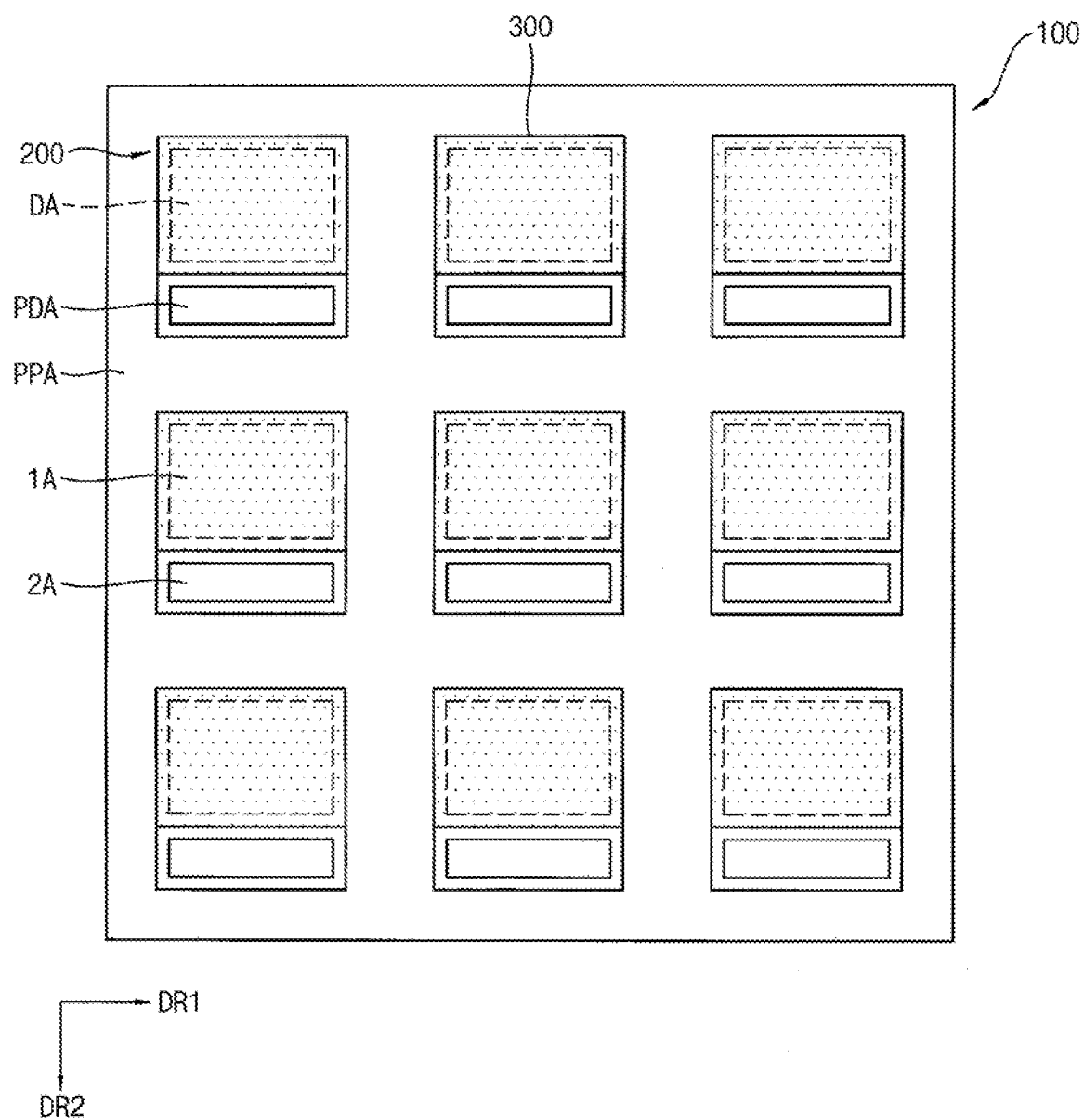
FIGS. 14 and 15 illustrate a step of detaching a protective film according to an embodiment.
Figure 15:
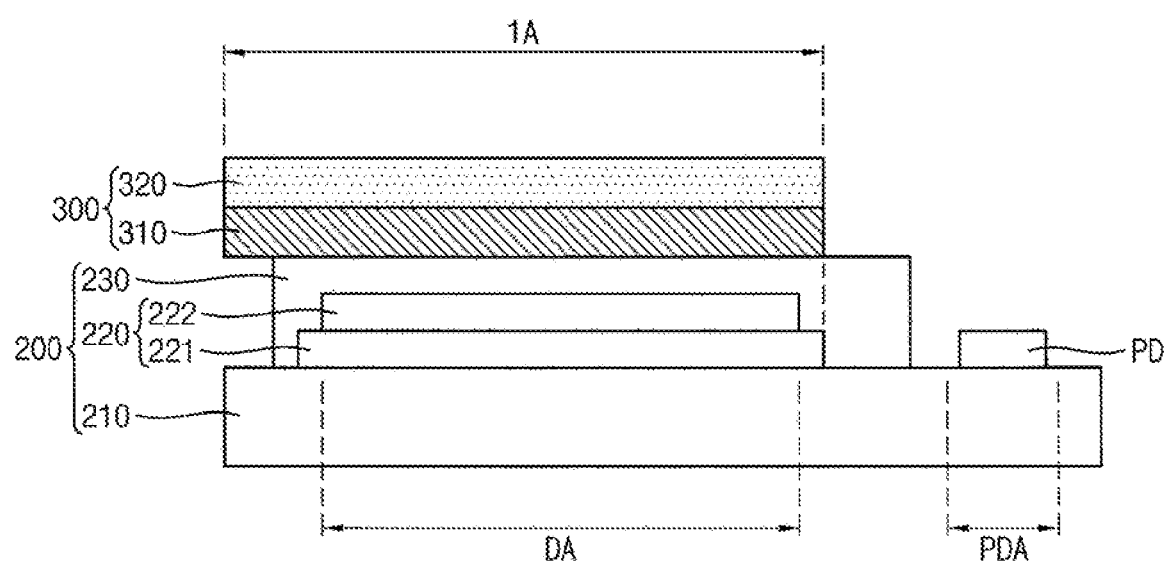

FIGS. 14 and 15 illustrate a step of detaching the protective film 300, according to an embodiment.

Referring to FIGS. 14 and 15, according to an embodiment, a portion of the protective film 300 that corresponds to the pad area PDA attached to each display panel 200 is detached along each cutting line CL. In such an embodiment, because of the lower adhesiveness of the hardened portion HP of the adhesive layer 310, a portion of the protective film 300 that corresponds to each pad area PDA easily detaches from the display panel 200.

In an embodiment, the second area 2A of the protective film 300 attached to the mother panel 100 is detached along the cutting lines CL. In other words, the second area 2A of the protective film 300 that overlaps the plurality of pad areas PDA and the peripheral area PPA is detached from the mother panel 100. Accordingly, portions of the protective film 300 that respectively correspond to the pad areas PDA can be substantially simultaneously detached. For example, a detaching member such as a detaching tape can be attached at one side of the second area 2A of the protective film 300, and a predetermined force applied to the detaching member detaches the second area 2A of the protective film 300 from the mother panel 100. Accordingly, only the first areas 1A of the protective film 300 remain on the display panels 200.

In a comparative example, when no hardened portion HP with reduced adhesiveness is formed in the adhesive layer 310, the adhesive layer 310 can be detached using a detaching member, such as a metal needle, to detach the protective film 300 from the mother panel 100. Accordingly, the display panel 200 can be damaged by the detaching member. When the display panel 200 includes a flexible glass substrate 210, the detaching member physically contacts or applies pressure to the substrate 210, thereby damaging the substrate 210. However, in a present embodiment, the adhesive layer 310 includes the hardened portion HP with reduced adhesiveness so that the protective film 300 can be easily detached from the mother panel 100 using a detaching member such as a detaching tape. Accordingly, the second area 2A of the protective film 300 can be detached from the mother panel 100 without damaging the display panel 200.

According to an embodiment, a portion of the protective film 300 that corresponds to the pad area PDA is detached from the display panel 200, so that the pad PD of the display panel 200 is exposed. Accordingly, subsequent processes, such as an image quality inspection of the display panel 200 through the exposed pad PD, etc., can be performed.

Figure 16:
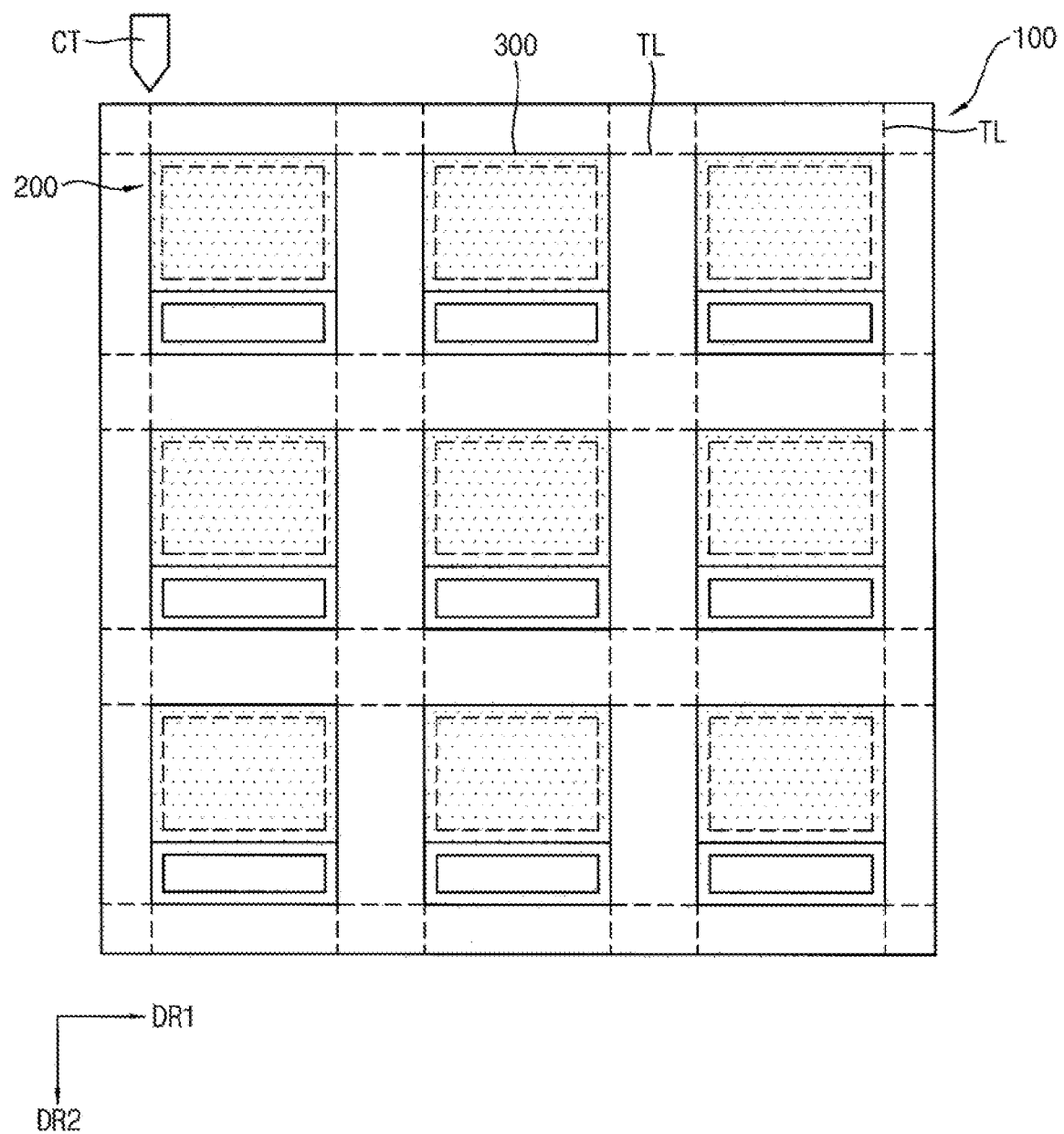
FIG. 16 is a plan view that illustrates a step of cutting a mother panel according to an embodiment.

FIG. 16 is a plan view that illustrates a step of cutting the mother panel 100, according to an embodiment.

Referring to FIG. 16, according to an embodiment, the mother panel 100 is cut so that the plurality of display panels 200 in the mother panel 100 are separated from each other. A cutting member CT cuts the mother panel 100 while moving along cutting lines TL formed along edges of the display panels 200. Each of the cutting lines TL is formed along one of the first direction DR1 or the second direction DR2. Accordingly, the plurality of display panels 200 in the mother panel 100 are separated into an individual display panel 200. For example, the cutting member CT is a cutting wheel, etc.

Hereinafter, a method of manufacturing a display device according to another embodiment will be described with reference to FIGS. 17 to 20. Descriptions of elements of a method of manufacturing a display device with reference to FIGS. 17 to 20, which are substantially the same as or similar to those of a method of manufacturing a display device with reference to FIGS. 1 to 16, will be omitted.

FIGS. 17, 18, 19, and 20 are cross-sectional views that illustrate a method of manufacturing a display device according to another embodiment.

Figure 17:
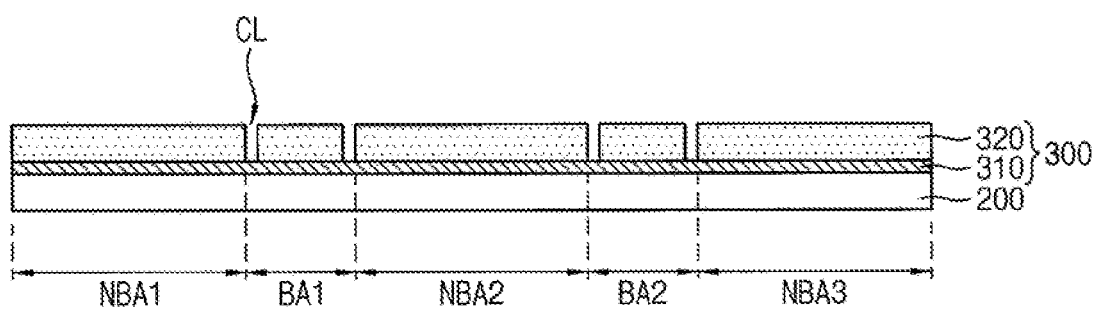
FIGS. 17, 18, 19, and 20 are cross-sectional views that illustrate a method of manufacturing a display device according to another embodiment.

Referring to FIG. 17, according to an embodiment, a protective film 300 is attached to a display panel 200, and the protective film 300 is half-cut.

According to an embodiment, the display panel 200 has at least one non-bendable area and at least one bendable area. The non-bendable area is a rigid area in which the display panel 200 is not folded, and the bendable area is a flexible area in which the display panel 200 can be folded. The display panel 200 according to a present embodiment is a foldable display panel, however, embodiments of the present disclosure are not limited thereto. In another embodiment, the display panel 200 is one of various flexible display panels, such as a bendable display panel, a rollable display panel, etc. In an embodiment, the display panel 200 includes a first non-bendable area NBA1, a second non-bendable area, NBA2, a third non-bendable area NBA3, a first bendable area BA1, and a second bendable area BA2. The first bendable area BA is disposed between the first non-bendable area NBA1 and the second non-bendable area NBA2, and the second bendable area BA2 is disposed between the second non-bendable area NBA2 and the third non-bendable area NBA3.

First, according to an embodiment, the protective film 300 is attached to the display panel 200. The protective film 300 includes an adhesive layer 310 and a protective layer 320 disposed on the adhesive layer 310. The protective film 300 is attached to the display panel 200 such that the adhesive layer 310 is in contact with the display panel 200.

Then, according to an embodiment, the protective film 300 is half-cut along a cutting line CL. The cutting line CL is formed between a non-bendable area and a bendable area. For example, the cutting line CL is formed between the first non-bendable area NBA1 and the first bendable area BA1, between the first bendable area BA1 and the second non-bendable area NBA2, between the second non-bendable area NBA2 and the second bendable area BA2, and between the second bendable area BA2 and the third non-bendable area NBA3. A total thickness of the protective layer 320 is cut along the cutting line CL, but the adhesive layer 310 is not cut or is partially cut along the cutting line CL.

Figure 18:
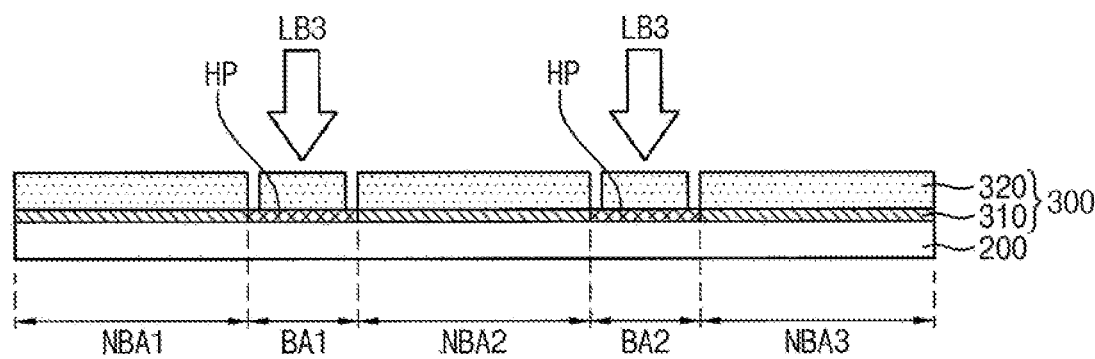

Referring to FIG. 18, according to an embodiment, a laser beam LB3 is irradiated to the protective film 300. The laser beam LB3 is a deep-ultraviolet (DUV) laser beam having a wavelength in a range from about 200 nm to about 300 nm, or in a range from about 200 nm to about 280 nm. The laser beam LB3 irradiates the adhesive layer 310 of the protective film 300 to form a hardened portion HP. In an embodiment, the laser beam LB3 substantially irradiates each of the bendable areas BA1 and BA2 to form the hardened portions HP that respectively overlap the bendable areas BA1 and BA2 as illustrated in FIG. 18. However, embodiments of the present disclosure are not limited thereto, and in other embodiments, the laser beam LB3 irradiates portions of the adhesive layer 310 exposed by the cutting line CL to form hardened portion that overlap the cutting line CL. An adhesiveness of the irradiated portion of the adhesive layer 310 decreases, therefore, an adhesiveness of the hardened portion HP of the adhesive layer 310 is less than an adhesiveness of a remaining portion of the adhesive layer 310 outside the hardened portion HP.

Figure 19:
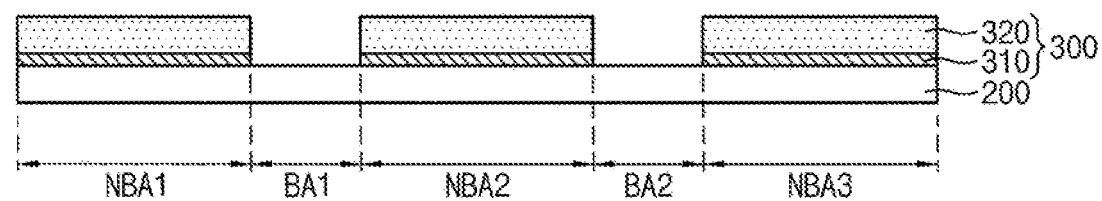

Referring to FIG. 19, according to an embodiment, portions of the protective film 300 that respectively correspond to the bendable areas BA1 and BA2 are detached from the display panel 200. Because the lower adhesiveness of the hardened portion HP of the adhesive layer 310, the portions of the protective film 300 that respectively correspond to the bendable areas BA1 and BA2 are easily detached from the display panel 200.

Figure 20:
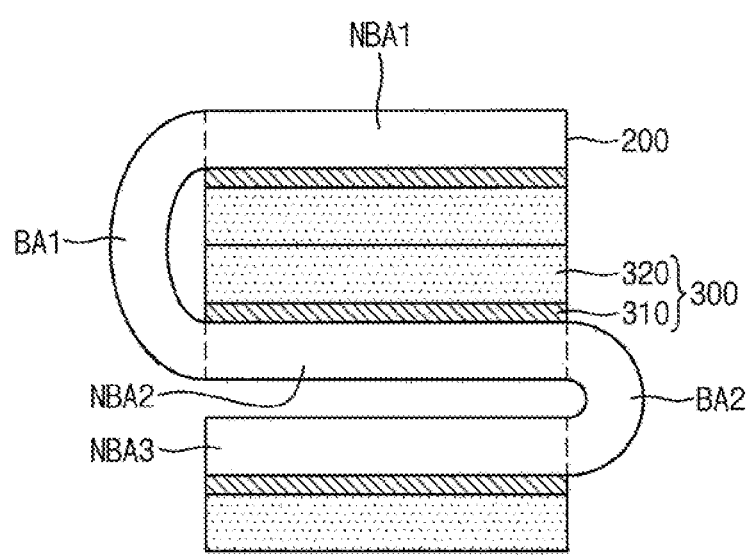

Referring to FIG. 20, according to an embodiment, each of the bendable areas BA1 and BA2 of the display panel 200 is folded. Because the portions of the protective film 300 that respectively correspond to the bendable areas BA1 and BA2 are detached, stress applied to each of the bendable areas BA1 and BA2 by folding the display panel 200 decreases, and each of the bendable areas BA1 and BA2 of the display panel 200 is easily folded. In an embodiment, the first non-bendable area NBA1 and the second non-bendable area NBA2 are out-folded by the first bendable area BA1, and the second non-bendable area NBA2 and the third non-bendable area NBA3 are in-folded by the second bendable area BA2.

A method of manufacturing a display device according to exemplary embodiments can be used with a display device included in a computer, a notebook, a mobile phone, a smartphone, a smart pad, a PMP, a PDA, an MP3 player, etc.

Although a method of manufacturing a display device and a laser device according to exemplary embodiments have been described with reference to the drawings, the illustrated embodiments are examples, and may be modified and changed by a person having ordinary knowledge in the relevant technical field without departing from the technical spirit described in the following claims.

What is claimed is:

1. A method of manufacturing a display device, the method comprising:
   attaching a protective film onto a display panel, wherein the display panel includes a display area and a pad area, and the protective film includes an adhesive layer and a protective layer disposed on the adhesive layer;
   half-cutting the protective film along a cutting line between the display area and the pad area wherein a groove is formed that corresponds to the cutting line, wherein a total thickness of the protective layer in the groove and a partial thickness of the adhesive layer in the groove are cut;
   irradiating a partially cut portion of the adhesive layer in the groove with a laser beam along at least a portion of the cutting line wherein a hardened portion is formed; and
   detaching a portion of the protective film that corresponds to the pad area along the cutting line.

2. The method of claim 1, wherein a wavelength of the laser beam is in a range from 200 nm to 300 nm.

3. The method of claim 1, wherein the adhesive layer includes at least one of polyurethane or silicon.

4. The method of claim 1, wherein an adhesiveness of a first portion of the adhesive layer that is irradiated with the laser beam is less than an adhesiveness of a second portion of the adhesive layer that is not irradiated with the laser beam.

5. The method of claim 1,
wherein a concentration of carbon in a first portion of the adhesive layer that is irradiated with the laser beam is less than a concentration of carbon in a second portion of the adhesive layer that is not irradiated with the laser beam, and
wherein a concentration of oxygen in the first portion of the adhesive layer is greater than a concentration of oxygen in the second portion of the adhesive layer.

6. The method of claim 1, wherein the laser beam swings along a width direction of the cutting line while moving along a length direction of the cutting line.

7. The method of claim 6, wherein a swing amplitude of the laser beam is greater than a width of the cutting line.

8. The method of claim 1, wherein a remaining thickness of the partially cut portion of the adhesive layer is in a range from 40 μm to 60 μm.

9. The method of claim 1, wherein the display panel includes:
a substrate;
a display unit disposed in the display area on the substrate; and
an encapsulation layer that covers the display unit,
wherein the cutting line overlaps the encapsulation layer.

10. The method of claim 9, wherein the substrate includes a flexible glass.

11. The method of claim 1,
wherein the display panel includes at least one non-bendable area and at least one bendable area,
wherein the at least one non-bendable area is a rigid area in which the display panel cannot be folded, and the at least one bendable area is a flexible area in which the display panel can be folded,
wherein the cutting line is formed between the at least one non-bendable area and the at least one bendable area, the laser beam substantially irradiates the at least one bendable area and forms a hardened portion in the adhesive layer that overlaps the at least one bendable area, and an adhesiveness of the hardened portion of the adhesive layer is less than an adhesiveness of a remaining portion of the adhesive layer outside the hardened portion,
wherein detached portions of the protective film correspond to the at least one bendable area, and further comprising folding the display panel along the at least one bendable area.

12. A method of manufacturing a display device, the method comprising:
attaching a protective film onto a mother panel that includes a plurality of display panels that each include a display area and a pad area, wherein the protective film includes an adhesive layer and a protective layer disposed on the adhesive layer;
half-cutting the protective film along a plurality of cutting lines between the display area and the pad area of each of the display panels wherein a plurality of grooves are formed that respectively correspond to the plurality of cutting lines wherein a total thickness of the protective layer in the groves and a partial thickness of the adhesive layer in the grooves are cut;
irradiating a partially cut portion of the adhesive layer in the grooves with a laser beam along at least a portion of each of the cutting lines wherein hardened portions are formed; and
detaching portions of the protective film that respectively correspond to each pad area of the plurality of display panels along the cutting lines.

13. The method of claim 12, wherein the cutting lines respectively surround each display area of the plurality of display panels.

14. The method of claim 13,
wherein each of the cutting lines has a rectangular shape in a plan view, and
wherein the laser beam irradiates at least one side of each of the cutting lines.

15. The method of claim 12, wherein the portions of the protective film that respectively correspond to the pad areas of the display panels are simultaneously detached.

* * * * *